US010420176B2

(12) United States Patent
Lee et al.

(10) Patent No.: US 10,420,176 B2
(45) Date of Patent: Sep. 17, 2019

(54) MICROWAVE OVEN WITH WATER FEEDING SYSTEM

(71) Applicant: WHIRLPOOL CORPORATION, Benton Harbor, MI (US)

(72) Inventors: Power Lee, Shenzhen (CN); Jack Xu, Shenzhen (CN)

(73) Assignee: Whirlpool Corporation, Benton Harbor, MI (US)

( * ) Notice: Subject to any disclaimer, the term of this patent is extended or adjusted under 35 U.S.C. 154(b) by 495 days.

(21) Appl. No.: 15/185,189

(22) Filed: Jun. 17, 2016

(65) Prior Publication Data

US 2016/0374159 A1 Dec. 22, 2016

(30) Foreign Application Priority Data

Jun. 19, 2015 (EP) .................................... 15172932

(51) Int. Cl.

| | |
|---|---|
| ***H05B 6/64*** | (2006.01) |
| ***H05B 6/80*** | (2006.01) |
| ***F24C 15/00*** | (2006.01) |
| ***F24C 15/32*** | (2006.01) |
| ***F24C 13/00*** | (2006.01) |
| *A21B 1/00* | (2006.01) |

(52) U.S. Cl.

CPC ............ *H05B 6/804* (2013.01); *F24C 13/00* (2013.01); *F24C 15/003* (2013.01); *F24C 15/32* (2013.01); *H05B 6/6402* (2013.01); *H05B 6/6479* (2013.01)

(58) Field of Classification Search

CPC .... H05B 6/6402; H05B 6/6408; H05B 6/642; H05B 6/6479; H05B 6/6485; H05B 6/687; H05B 6/704; H05B 6/707; H05B 6/725; H05B 6/74; H05B 6/804; F24C 15/003; F24C 15/006; F24C 15/02; F24C 15/025; F24C 15/16; F24C 15/2007; F24C 15/32; F24C 15/327; F24C 13/00

USPC ....... 219/400, 401, 678, 679, 680, 681, 682, 219/686

See application file for complete search history.

(56) References Cited

U.S. PATENT DOCUMENTS

| | | | | |
|---|---|---|---|---|
| 2007/0215592 A1* | 9/2007 | Wang | F24C 15/327 | 219/400 |
| 2007/0227364 A1* | 10/2007 | Andoh | A21B 3/04 | 99/324 |
| 2008/0245238 A1 | 10/2008 | Huiberts | | |

FOREIGN PATENT DOCUMENTS

| | | | | |
|---|---|---|---|---|
| DE | 102014114537 A1 | | 4/2015 | |
| EP | 1757861 A1 | | 2/2007 | |
| EP | 2662634 A1 | * | 11/2013 | F42C 14/005 |

OTHER PUBLICATIONS

European Patent Office, European Search Report and Opinion for European Application No. 15172932.4-1605, dated Dec. 23, 2015, 6 pages.

* cited by examiner

*Primary Examiner* — Hung D Nguyen
(74) *Attorney, Agent, or Firm* — Price Heneveld LLP

(57) ABSTRACT

A domestic microwave oven is provided having an oven cavity, a water reservoir, a piping system coupling the reservoir and the oven cavity, and a pump for pumping a predetermined amount of water into the oven cavity. The pump is a mono-directional positive displacement pump and the piping system includes a by-pass coupled in parallel to the pump and an on/off electro valve configured to allow a drainage of the piping system when the pump is idle.

20 Claims, 2 Drawing Sheets

MICROWAVE OVEN WITH WATER FEEDING SYSTEM

CROSS-REFERENCE TO RELATED APPLICATION

This application claims priority to European Patent Application EP 15172932.4, filed Jun. 19, 2015, now issued as European Patent EP 3 106 757 on Jan. 30, 2019, entitled "OVEN WITH WATER FEEDING SYSTEM," the disclosure of which is incorporated herein by reference in its entirety.

FIELD OF DISCLOSURE

The present disclosure generally relates to a domestic oven comprising a cavity, a water reservoir, a piping system connecting the reservoir and the cavity, and a pump for pumping a predetermined amount of water to the oven cavity.

BACKGROUND

Ovens that apply water for cooking are well known in the market of domestic cooking ovens where there is the need for steam cooking or the need for using water as an ingredient in certain recipes such as the preparation of pasta or the dough of a pizza. Some microwave ovens are provided with a bowl and a stirrer in which the user will add the solid contents of a food package (with well defined amount of ingredients) wherein a pump in the oven feeds a predetermined amount of water in order to obtain a final food preparation after the cooking or heating procedure. In these types of cooking processes a very precise amount of water must be added to the container or bowl, but it is also necessary to avoid water that may remain in the piping assembly, particularly in the piping downstream from the pump. The need to remove water downstream from the pump derives from the possibility that water in the piping assembly can be heated by either microwaves or by convection from the heated cavity. In addition, certain recipes need to avoid unwanted dripping of water during the cooking process or the generation of steam. Moreover, water remaining in the piping system can also lead to deleterious results in terms of food safety standards.

In order to solve the above problems, i.e. accuracy in water dosing and drainage of piping system, known solutions comprise the use of positive displacement pumps with a bi-directional operation in which the flow of water can be easily reversed by changing the rotation direction of the motor. Such pumps are for instance peristaltic pumps, gear pumps or flexible impeller pumps. These known solutions have the drawback of an average high cost. For instance, peristaltic pumps are mainly used in laboratory equipment and their average cost is too high for application in small domestic appliances such as microwave ovens or the like.

It is therefore an object of the present disclosure to provide a domestic oven that can add an appropriate amount of water for cooking while eliminating residual water in the piping assembly.

SUMMARY

According to one aspect of the present disclosure, a domestic oven is provided having an oven cavity, a water reservoir, a piping system coupling the water reservoir and the oven cavity, and a pump for pumping a predetermined amount of water into the oven cavity. The pump is a mono-directional positive displacement pump and the piping system includes a by-pass line coupled in parallel to the pump and an on/off electro valve configured to allow a drainage of the piping system when the pump is idle.

According to another aspect of the present disclosure, a microwave oven is provided having an oven cavity, a water reservoir, a piping system coupling the water reservoir and the oven cavity, and a pump for pumping a predetermined amount of water into the oven cavity. The pump is a mono-directional positive displacement pump and the piping system includes a by-pass line coupled in parallel to the pump and an on/off electro valve configured to allow a drainage of the piping system when the pump is idle. The pump and the on/off electro valve are coupled to a control unit.

According to yet another aspect of the present disclosure, a microwave oven is provided having an oven cavity, a water reservoir, a piping system coupling the water reservoir and the oven cavity, and a diaphragm pump for pumping a predetermined amount of water into the oven cavity. The diaphragm pump is a mono-directional positive displacement pump and the piping system comprises a by-pass line coupled in parallel to the diaphragm pump and an on/off electro valve configured to allow a drainage of the piping system when the diaphragm pump is idle. The piping system includes a flow meter electrically coupled to a control unit and the flow meter is coupled downstream from the diaphragm pump.

Further advantages and features according to the present disclosure will become clear from the following detailed description, provided by way of non-limiting examples, with reference to the attached drawings herein.

DETAILED DESCRIPTION OF EMBODIMENTS

Figure 1:
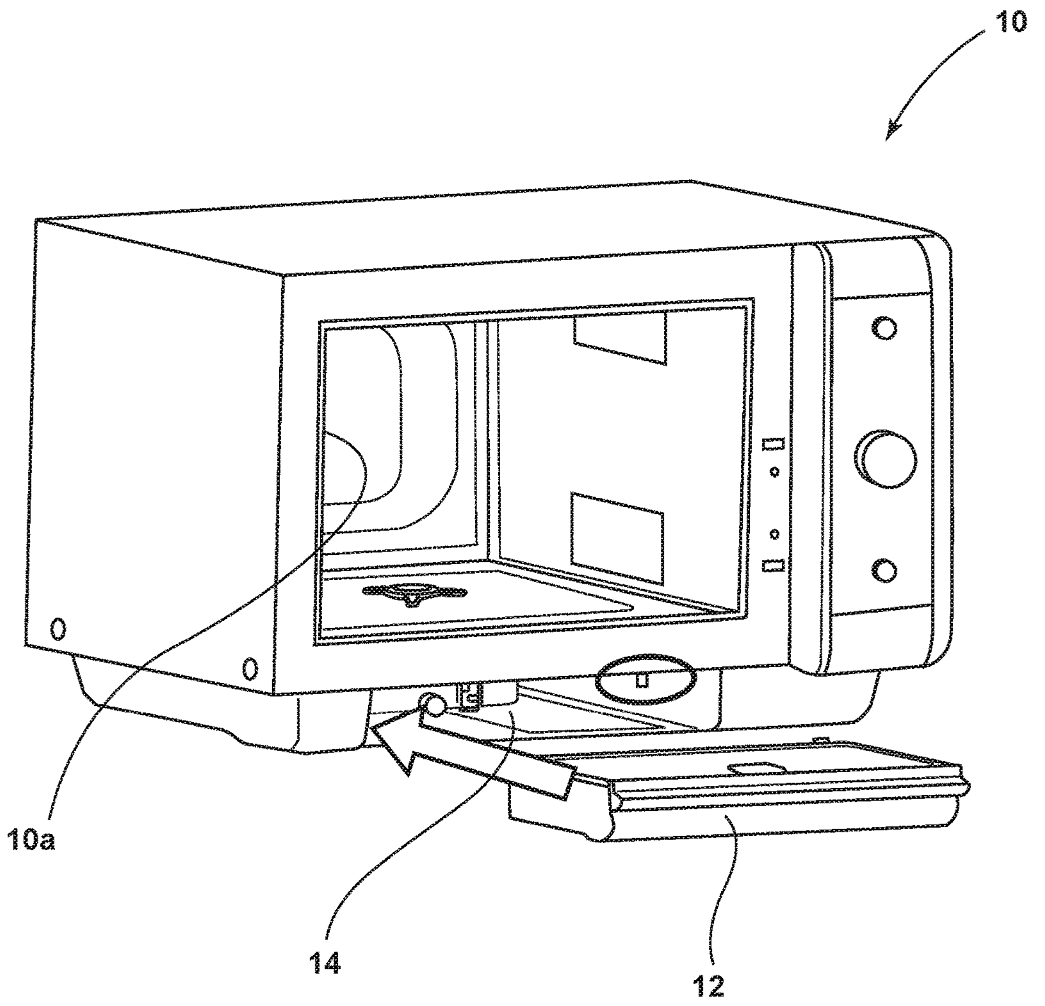
FIG. 1 is a perspective view of a microwave oven according to the disclosure.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

According to one aspect of the disclosure, the bi-directional positive displacement pump, particularly the peristaltic pump, is replaced by a much simpler and cheaper mono-directional positive displacement pump. With this term we mean any positive displacement pumps which cannot reverse the direction of flow by a simple means, for instance by reversing the direction of rotation of the motor. According to a preferred embodiment of the disclosure, such pump is a diaphragm pump or a vibration pump. With the term "vibration pump" we mean known pumps used mainly in coffee machines or the like, where a reciprocating piston is moved back and forth by an inductor. Such low cost pumps are also known as metering pumps. According to the disclosure, such pump is used in combination with a parallel by-pass circuit provided with a valve. The overall cost of a diaphragm pump or a vibration pump plus a simple by-pass circuit and a valve is lower than the cost of a peristaltic pump. Moreover the flow rate of a diaphragm or vibration pump is higher than the flow rate of a corresponding peristaltic pump, allowing the user to decrease the overall cooking time. Since the diaphragm or vibration pump cannot reverse its flow, by opening the valve in the by-pass circuit it is possible to obtain an easy draining by gravity of the piping system downstream and upstream the pump.

Figure 2:
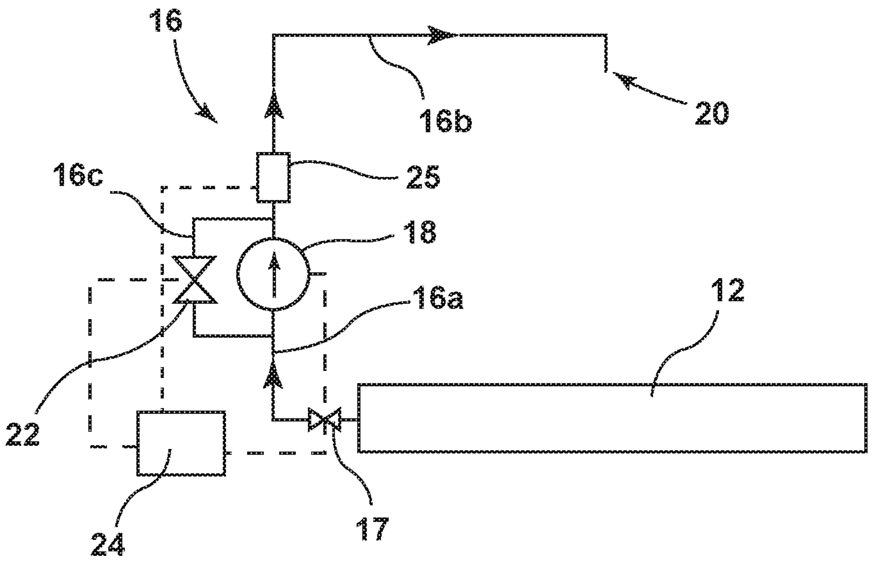
FIG. 2 is a schematic view of the water system used in the oven of FIG. 1, in a first configuration (water feeding)
Figure 3:
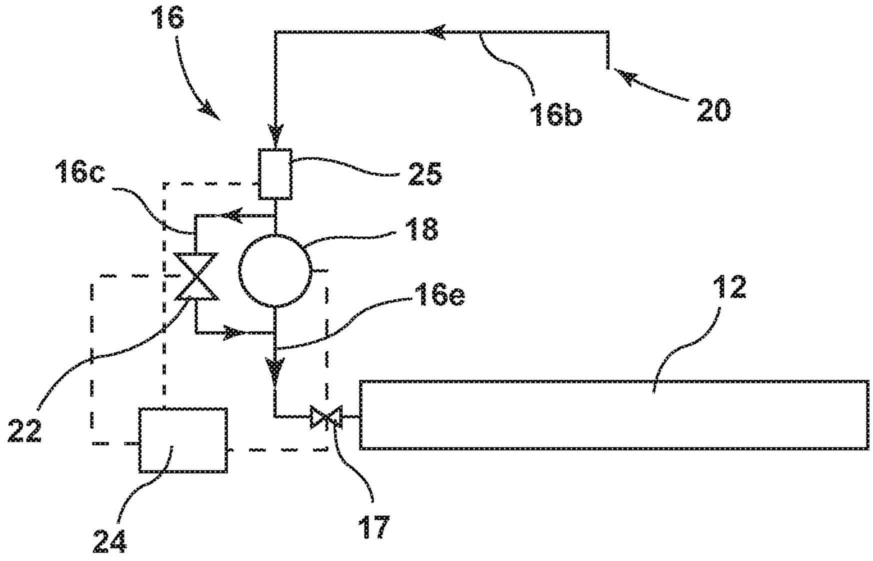
FIG. 3 is a schematic view similar to FIG. 2 where the water system is shown in a second configuration (water draining).

Referring to the embodiment generally illustrated in FIGS. 1-3, a microwave oven 10 is provided with a water reservoir 12. The water reservoir 12 can be inserted as a drawer in a seat 14 of the microwave oven 10.

A hydraulic piping system (piping system) 16 is coupled with the water reservoir 12, and comprises an automatic valve connection 17 with the water reservoir 12. The automotive valve of the piping system 16 is in an open configuration when the water reservoir 12 is inserted into the seat. A first pipe 16*a* couples the water reservoir 12 and a diaphragm pump 18 while a second pipe 16*b* couples the diaphragm pump 18 to a nozzle 20 for feeding water into a bowl (not shown) placed in a cavity 10*a* of the microwave oven 10. In parallel with a diaphragm pump 18, the piping system 16 has a by-pass line 16*c* wherein the by-pass line 16*c* has an on/off electro valve 22 installed or coupled. The on/off electro valve 22 and the diaphragm pump 18 are electrically coupled to a control unit 24 which is part of the overall piping system 16 of the microwave oven 10. In some embodiments, other components may be present in the piping system 16, for instance a flow meter 25 for measuring the pumped amount of water, may be electrically connected to the control unit 24.

When the user starts the cooking/heating cycle, water is automatically added to the food by switching on the diaphragm pump 18 and by keeping the on/off electro valve 22 in a closed configuration. When the on/off electro valve 22 is in the closed configuration, there is no flow in the by-pass line 16*c*, as illustrated in FIG. 2. After the diaphragm pump 18 finishes the addition of the desired amount of water (such amount being controlled by the flow meter 25), the valve 22 is opened (i.e. flow allowed in the by-pass line 16*c*) and the remaining water in the pipes 16 flow back to the reservoir 12. This configuration (shown in FIG. 3) allows remaining water to come back to the reservoir 12.

In some embodiments, a vibration pump may be used in the hydraulic piping system rather than the diaphragm pump 18. The type of pump used is not particularly limiting but the pump used should have a bi-directional displacement. In other embodiments, the pumps disclosed herein should have the same advantages as a bi-directional displacement pump, particularly a peristaltic pump, without the problem of its high cost.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

LISTING OF NON-LIMITING EMBODIMENTS

Embodiment A is a domestic oven comprising an oven cavity, a water reservoir, a piping system coupling the water reservoir and the oven cavity, and a pump for pumping a predetermined amount of water into the oven cavity, wherein the pump is a wherein the pump is a mono-directional positive displacement pump and the piping system comprises a by-pass line coupled in parallel to the pump and an on/off electro valve configured to allow a drainage of the piping system when the pump is idle.

The device of Embodiment A wherein the pump is a vibration pump or a diaphragm pump.

The device of Embodiment A or Embodiment A with one or more of the intervening features wherein the water reservoir is shaped as a drawer configured to be inserted in a seat below the oven cavity.

The device of Embodiment A or Embodiment A with one or more of the intervening features wherein the piping system comprises an automatic valve which is in an open configuration when the water reservoir is inserted into the seat.

The device of Embodiment A or Embodiment A with one or more of the intervening features wherein the pump and the on/off electro valve are coupled to a control unit.

The device of Embodiment A or Embodiment A with one or more of the intervening features wherein the domestic oven is a microwave oven.

The device of Embodiment A or Embodiment A with one or more of the intervening features wherein the piping system comprises a flow meter.

The device of Embodiment A or Embodiment A with one or more of the intervening features wherein the flow meter is coupled downstream from the pump.

The device of Embodiment A or Embodiment A with one or more of the intervening features wherein the flow meter is electrically coupled to a control unit.

Embodiment B is a microwave oven comprising an oven cavity, a water reservoir, a piping system coupling the water reservoir and the oven cavity, and a pump for pumping a predetermined amount of water into the oven cavity, wherein the pump is a mono-directional positive displacement pump and the piping system comprises a by-pass line coupled in parallel to the pump and an on/off electro valve configured to allow a drainage of the piping system when the pump is idle, and wherein the pump and the on/off electro valve are coupled to a control unit.

The device of Embodiment B wherein the pump is a vibration pump or a diaphragm pump.

The device of Embodiment B or Embodiment B with one or more of the intervening features wherein the water reservoir is shaped as a drawer configured to be inserted in a seat below the oven cavity.

The device of Embodiment B or Embodiment B with one or more of the intervening features wherein the piping system comprises an automatic valve which is in an open configuration when the water reservoir is inserted into the seat.

The device of Embodiment B or Embodiment B with one or more of the intervening features wherein the piping system comprises a flow meter.

The device of Embodiment B or Embodiment B with one or more of the intervening features wherein the flow meter is coupled downstream from the pump.

The device of Embodiment B or Embodiment B with one or more of the intervening features wherein the flow meter is electrically coupled to the control unit.

Embodiment C is a microwave oven comprising an oven cavity, a water reservoir, a piping system coupling the water reservoir and the oven cavity, and a diaphragm pump for pumping a predetermined amount of water into the oven cavity, wherein the diaphragm pump is a mono-directional positive displacement pump and the piping system comprises a by-pass line coupled in parallel to the diaphragm pump and an on/off electro valve configured to allow a drainage of the piping system when the diaphragm pump is idle, and wherein the piping system comprises a flow meter electrically coupled to a control unit and the flow meter is coupled downstream from the diaphragm pump.

The device of Embodiment C wherein the water reservoir is shaped as a drawer configured to be inserted in a seat below the oven cavity.

The device of Embodiment C or Embodiment C with one or more of the intervening features wherein the piping system comprises an automatic valve which is in an open configuration when the water reservoir is inserted into a seat.

The device of Embodiment C or Embodiment C with one or more of the intervening features wherein the pump and the on/off electro valve are coupled to the control unit.

The invention claimed is:

1. A domestic oven comprising:
- an oven cavity;
- a water reservoir;
- a piping system coupling the water reservoir and the oven cavity; and
- a pump for pumping a predetermined amount of water into the oven cavity;
- wherein the pump is a mono-directional positive displacement pump and the piping system comprises a by-pass line coupled in parallel to the pump and an on/off electro valve configured to allow a drainage of the piping system through the by-pass line when the pump is idle.

2. The domestic oven of claim 1, wherein the pump is a vibration pump or a diaphragm pump.

3. The domestic oven of claim 1, wherein the water reservoir is shaped as a drawer configured to be inserted in a seat below the oven cavity.

4. The domestic oven of claim 3, wherein the piping system comprises an automatic valve which is in an open configuration when the water reservoir is inserted into the seat.

5. The domestic oven of claim 1, wherein the pump and the on/off electro valve are coupled to a control unit.

6. The domestic oven of claim 1, wherein the domestic oven is a microwave oven.

7. The domestic oven of claim 1, wherein the piping system comprises a flow meter.

8. The domestic oven of claim 7, wherein the flow meter is coupled downstream from the pump.

9. The domestic oven of claim 7, wherein the flow meter is electrically coupled to a control unit.

10. A microwave oven comprising:
- an oven cavity;
- a water reservoir;
- a piping system coupling the water reservoir and the oven cavity; and
- a pump for pumping a predetermined amount of water into the oven cavity;
- wherein the pump is a mono-directional positive displacement pump and the piping system comprises a by-pass line coupled in parallel to the pump and an on/off electro valve configured to allow a drainage of the piping system through the by-pass line when the pump is idle; and
- wherein the pump and the on/off electro valve are coupled to a control unit.

11. The microwave oven of claim 10, wherein the pump is a vibration pump or a diaphragm pump.

12. The microwave oven of claim 10, wherein the water reservoir is shaped as a drawer configured to be inserted in a seat below the oven cavity.

13. The microwave oven of claim 12, wherein the piping system comprises an automatic valve which is in an open configuration when the water reservoir is inserted into the seat.

14. The microwave oven of claim 10, wherein the piping system comprises a flow meter.

15. The microwave oven of claim 14, wherein the flow meter is coupled downstream from the pump.

16. The microwave oven of claim 14, wherein the flow meter is electrically coupled to the control unit.

17. A microwave oven comprising:

an oven cavity;

a water reservoir;

a piping system coupling the water reservoir and the oven cavity; and a diaphragm pump for pumping a predetermined amount of water into the oven cavity;

wherein the diaphragm pump is a mono-directional positive displacement pump and the piping system comprises a by-pass line coupled in parallel to the diaphragm pump and an on/off electro valve configured to allow a drainage of the piping system through the by-pass line when the diaphragm pump is idle; and wherein the piping system comprises a flow meter electrically coupled to a control unit and the flow meter is coupled downstream from the diaphragm pump; and wherein the by-pass line is configured to allow a drainage of the piping system to the water reservoir when the diaphragm pump is idle.

18. The microwave oven of claim 17, wherein the water reservoir is shaped as a drawer configured to be inserted in a seat below the oven cavity.

19. The microwave oven of claim 18, wherein the piping system comprises an automatic valve which is in an open configuration when the water reservoir is inserted into the seat.

20. The microwave oven of claim 17, wherein the pump and the on/off electro valve are coupled to the control unit.

* * * * *